United States Patent
Anders et al.

(10) Patent No.: US 11,157,544 B2
(45) Date of Patent: Oct. 26, 2021

(54) ONLINE SITE PREDICTION AND MITIGATION

(71) Applicant: International Business Machines Corporation, Armonk, NY (US)

(72) Inventors: Kelley Anders, East New Market, MD (US); Liam S. Harpur, Skerries (IE); Al Chakra, Apex, NC (US); Robert H. Grant, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 16/135,425

(22) Filed: Sep. 19, 2018

(65) Prior Publication Data
US 2020/0089778 A1  Mar. 19, 2020

(51) Int. Cl.
| | |
|---|---|
| *G06F 40/10* | (2020.01) |
| *G06F 16/48* | (2019.01) |
| *G06F 16/951* | (2019.01) |
| *G06F 40/134* | (2020.01) |
| *G06F 40/197* | (2020.01) |
| *G06F 40/20* | (2020.01) |
| *G06F 16/955* | (2019.01) |

(52) U.S. Cl.
CPC .......... *G06F 16/48* (2019.01); *G06F 16/951* (2019.01); *G06F 16/9558* (2019.01); *G06F 40/134* (2020.01); *G06F 40/197* (2020.01); *G06F 40/20* (2020.01)

(58) Field of Classification Search
CPC ...... G06F 16/48; G06F 16/954; G06F 16/955; G06F 17/2785; G06F 11/3065
See application file for complete search history.

(56) References Cited

U.S. PATENT DOCUMENTS

| | | | | |
|---|---|---|---|---|
| 6,278,966 | B1 * | 8/2001 | Howard | G06F 11/3414 703/22 |
| 6,389,436 | B1 * | 5/2002 | Chakrabarti | G06F 16/355 715/229 |
| 6,836,773 | B2 * | 12/2004 | Tamayo | G06F 16/951 |
| 7,716,225 | B1 * | 5/2010 | Dean | G06F 40/134 707/748 |
| 8,495,484 | B2 * | 7/2013 | Ahmed | G06F 16/9535 715/205 |
| 9,020,904 | B2 | 4/2015 | Douglis | |
| 9,563,335 | B1 * | 2/2017 | DeLuca | G06F 40/14 |
| 9,569,522 | B2 * | 2/2017 | Sreenivas Prasad | H04L 61/306 |
| 9,619,570 | B2 * | 4/2017 | Chakra | G06F 16/9535 |
| 9,672,297 | B1 * | 6/2017 | DeLuca | G06F 16/90328 |
| 9,697,528 | B2 * | 7/2017 | Ahmed | G06F 11/3006 |
| 9,798,766 | B2 * | 10/2017 | DeLuca | G06F 16/90328 |
| 9,858,344 | B2 * | 1/2018 | Chakra | H04L 67/306 |

(Continued)

*Primary Examiner* — Maikhanh Nguyen
(74) *Attorney, Agent, or Firm* — Garg Law Firm, PLLC; Rakesh Garg; Michael O'Keefe

(57) ABSTRACT

Using natural language analysis of content at URLs accessed by a user, content metadata is generated. From the content metadata and from activity information associated with a set of URLs accessed by the user, a class model is generated that represents a probability that content referenced by a URL will distract the user. Using the class model to analyze content referenced by a received URL, a probability is forecasted that the content referenced by the received URL will distract the user.

16 Claims, 8 Drawing Sheets

(56) References Cited

U.S. PATENT DOCUMENTS

| | | | |
|---|---|---|---|
| 9,990,341 B2* | 6/2018 | DeLuca | H04L 67/22 |
| 10,671,686 B2* | 6/2020 | Bao | G06F 16/954 |
| 2006/0106793 A1* | 5/2006 | Liang | G06F 16/3329 |
| 2011/0035343 A1* | 2/2011 | Bellamy | G06F 40/00 |
| | | | 706/11 |
| 2013/0036344 A1* | 2/2013 | Ahmed | G06F 16/9535 |
| | | | 715/205 |
| 2013/0346841 A1* | 12/2013 | Ahmed | H04L 67/146 |
| | | | 715/208 |
| 2014/0108901 A1* | 4/2014 | Carriero | G06F 16/9562 |
| | | | 715/206 |
| 2014/0244646 A1* | 8/2014 | Bao | G06F 16/954 |
| | | | 707/737 |
| 2015/0012517 A1* | 1/2015 | Chakra | H04L 67/10 |
| | | | 707/706 |
| 2015/0032890 A1* | 1/2015 | Bott | G06F 21/552 |
| | | | 709/224 |
| 2015/0096041 A1* | 4/2015 | Bommireddipalli | |
| | | | G06F 16/955 |
| | | | 726/26 |
| 2015/0186542 A1* | 7/2015 | Singh | G06F 16/9566 |
| | | | 715/206 |
| 2015/0356196 A1* | 12/2015 | Sreenivas Prasad | G06F 16/951 |
| | | | 707/740 |
| 2016/0140611 A1* | 5/2016 | Schler | G06Q 30/0257 |
| | | | 705/14.55 |
| 2016/0147898 A1* | 5/2016 | Chakra | H04L 67/10 |
| | | | 707/706 |
| 2017/0337163 A1 | 11/2017 | Burkard | |
| 2018/0032491 A1 | 2/2018 | Heo | |
| 2018/0084002 A1 | 3/2018 | Shnitzer | |

\* cited by examiner

ONLINE SITE PREDICTION AND MITIGATION

TECHNICAL FIELD

The present invention relates generally to a method, system, and computer program product for predicting user activity online. More particularly, the present invention relates to a method, system, and computer program product for online site prediction and mitigation.

BACKGROUND

A hyperlink, or simply a link, is a reference to a resource. A user can access the resource referenced by the link by selecting text or graphics associated with the link in a manner supported by a particular user interface—for example by clicking on, tapping, or hovering over the displayed text or graphics.

A Uniform Resource Locator (URL) is a reference to an online resource that specifies both the location of the resource on a computer network and a mechanism for retrieving the resource. URLs are a subset of hyperlinks, but are used interchangeably with the term "links" herein. As used herein, site, website, and web page all refer to content referenced by a URL on a network.

URLs are used most commonly to reference web pages, using the http or https prefixes. For example, the URL https://en.wikipedia.org/wiki/Main_Page denotes the main page of the Wikipedia website in English. (Wikipedia is a registered trademark of Wikimedia Foundation, Inc., in the United States and other countries.)

Because URLs reference content on a network, such as the Internet or an internal intranet, URLs are commonly sent to others as pointers to the content located at the URL. For example, a message referencing the Wikipedia main page might be, "The main Wikipedia page is at https://en.wikipedia.org/wiki/Main_Page."

SUMMARY

The illustrative embodiments provide a method, system, and computer program product. An embodiment includes a method that generates, using natural language analysis of content at URLs accessed by a user, content metadata. An embodiment constructs, from the content metadata and from activity information associated with a set of URLs accessed by the user, a class model, the class model representing a probability that content referenced by a URL will distract the user. An embodiment forecasts, using the class model to analyze content referenced by a received URL, a probability that the content referenced by the received URL will distract the user.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
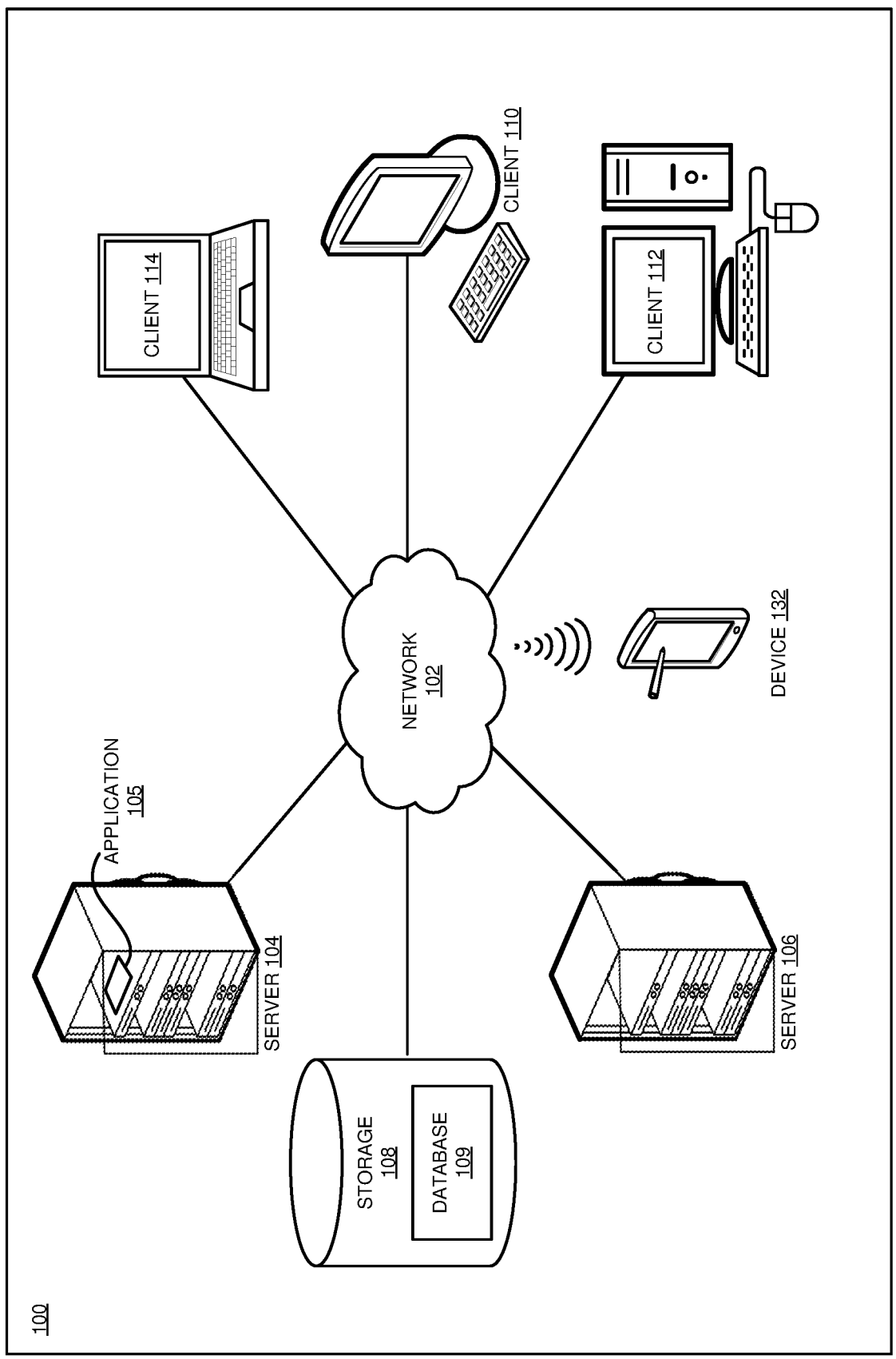
FIG. 1 depicts a block diagram of a network of data processing systems in which illustrative embodiments may be implemented.

Computer network users often send links to each other to reference the content pointed to by the link. For example, in a work environment a manager might send his or her direct reports a message like, "Here's some information on the chipset we're thinking about for the new project," followed by a URL pointing to the technical documentation section of the chipset manufacturer's website.

However, users rarely simply go to a site, read the content there, and then go back to what they were doing previously. Instead, the content at one site may include links to related information, or prompt a search for related content. For example, in the case of the URL pointing to the technical documentation section of the chipset manufacturer's website, when there a user might encounter an unfamiliar technical term, go to a search site to search for additional sites explaining the new term, and go to a third site for a detailed explanation of the new term.

As well, the content at one site may prompt an excursion into unrelated content. For example, a reference on the chipset manufacturer's website to a family of chips, all with codenames corresponding to North American rivers, might prompt a user to read about the actual rivers.

In addition, a user might finish up at one site, but instead of going back to previous work, check on a social media site, a breaking news site, or other non-work-related site. Often, content at one site prompts a visit to an additional site. For example, a friend on a social media site might reference a movie, prompting an excursion to additional sites for reviews of the movie, locations where one could watch the movie, or a search for other movies the cast had acted in.

The illustrative embodiments recognize that such excursions into non-work-related content take time and focus away from work a user is paid to do, and employers would prefer to minimize them. However, banning access to all outside sites also eliminates access to outside sites users might need for their jobs, and limiting access only to specific sites requires maintenance and exception processing. Instead, a solution is needed that predicts a user's subsequent URL, and takes steps to mitigate extraneous site visits.

The illustrative embodiments recognize that the presently available tools or solutions do not address these needs or provide adequate solutions for these needs. The illustrative embodiments used to describe the invention generally address and solve the above-described problems and other problems related to online site prediction and mitigation.

An embodiment can be implemented as a software application. The application implementing an embodiment can be configured as a modification of an existing application for viewing online content, as a separate application that operates in conjunction with an existing application for viewing online content, a standalone application, or some combination thereof.

Particularly, some illustrative embodiments provide a method that from a current URL, predicts a user's subsequent URL, and mitigates extraneous site visits by substituting a different URL for the current URL.

An embodiment begins by collecting a baseline of a user's online activity. The baseline includes information related to the user's online activity, such as which portions of which sites a user visits, the contents of those portions of those sites, at which times of day or days of the week, from which devices, using which browsers or applications, and whether the user provides data to a site or merely consumes site content passively. An embodiment collects data for the baseline either in real time, as the user is active online, from archived data, or both. An embodiment collects real-time and archived data from any suitable source, including a user's browser history, cookie information, and information collected from social networking sites.

In addition, an embodiment supplements data for one user with data associated with similarly-situated users. For example, a user may be new to a workplace where an embodiment is installed. However, others in the new user's group or working on the same projects as the new user data are likely to have similar habits, and data collected from the other users can supplement for the user's own sparse initial data.

An embodiment stores the collected baseline data in a repository, for example a database. The repository may be stored in any suitable location, such as on a server inside or outside a corporate firewall, or in a cloud storage environment.

When an embodiment has collected sufficient baseline data, the embodiment analyzes the data to determine which URLs, referencing which content and associated with which circumstances, have what probability of leading a user to extraneous sites. An embodiment uses natural language understanding techniques on the content of visited sites to extract metadata from that content, including concepts, categories, and keywords. An embodiment derives a class model reflecting the results of the content analysis, as well as analysis of the non-content portions of the baseline data. An embodiment derives the class model using latent class analysis, inferring a taxonomy to understand which types of behavior—as surfaced in site content and circumstances surrounding accessing of that content—are suggestive of a particular grouping or cluster. The class model characterizes each class as a pattern of conditional probabilities, each indicating the chance that a variable associated with the class will take on certain values. For example, if a user is new to a workplace where an embodiment is installed, class analysis may show that others are in the new user's group or working on the same projects as the new user data are likely to have similar habits. Thus data collected from the other users can supplement for the user's own sparse initial data. Other techniques of cluster analysis may also be used to derive an appropriate class model without departing from the scope of the embodiments.

For example, class analysis may determine that the time of day may be an important factor in determining which URLs a user accesses. For example, a user might finish up at a work-related site, but instead of going back to previous work, the user checks on a social media site, a breaking news site, or other non-work-related site. Such behavior might be more frequent if the user finishes up at the work-related site right after lunchtime, or mid-afternoon, when many users experience a lull, lose focus on work, and are tempted by non-work matters. Such behavior might be less frequent mid-morning, when many users are most alert and least distracted by non-work matters.

As another example, class analysis may determine that a certain combination of sites visited, or the sites visited immediately before and after a particular URL, prompt a non-work-related excursion. For example, if the user was looking at a social media site immediately before a particular work-related URL, and the user goes to the work-related URL, reads the content, and then immediately goes back to the social media site, and this pattern repeats often, this user is likely to continue in this pattern in connection with a different work-related URL. On the other hand, if another user was looking at a work-related site, was referred to a different work-related site, but then either returned to the first work-related site or went to a third work-related site, and this pattern repeats often, this user is likely to continue in this work-related pattern. A third user might start at a work-related site, be referred to a different work-related site, then go to a non-work-related site. If this pattern repeats often, this user is likely to continue in this distractible pattern.

As another example, class analysis may determine that the content of a site prompts a non-work-related excursion. For example, a user may be reading technical documentation for an upcoming work project on a chipset manufacturer's website and come across a reference to a family of chips, all with codenames corresponding to North American rivers. Such a reference might prompt a user to go to other sites to read about the actual rivers, because the user is also interested in river kayaking. However, the same user might come across a reference to a different family of chips, all with codenames corresponding to ski resorts, and not be tempted away because this user does not care for snow skiing.

Class analysis may also determine, for example, that the presence of advertisements, or other added content, on a site prompts a non-work-related excursion. For example, a site—even work-related—may include an advertisement for a store a user regularly shops at, tempting the user to click on the advertisement instead of focusing on the work-related content.

Once an embodiment has constructed a class model for a user, an embodiment monitors messages sent to the user. Messages for the user may be received via email, a messaging application, a social media platform, a website, or any other means of receiving information. An embodiment analyzes messages to extract a URL, analyzes content referenced by the URL and metadata associated with the messages, and applies a message containing a URL to the class model to determine a probability that this URL will lead a user to extraneous sites. If the probability is above a threshold, and the user accesses the URL (for example by clicking on or tapping the received link), the embodiment suggests a different URL, or actually substitutes a different URL for the received URL. The different URL has generally the same content as the first URL, but is missing content that is likely to prompt a user to distract a user. For example, the different URL may omit, eliminate, or remove content present at the first URL, or the different URL may mask, hide content present at the first URL, or the different URL may have replacement or substitute content from the first URL. The different URL might be an internal version of an external website, for example, or an ad-free version of a site.

An embodiment also creates a "breadcrumb trail"-a trail, chain, sequence, or record of the site the user accessed immediately before the received URL, the substituted URL or the received URL if the user declined a substitution, and the site the user accessed immediately after the received or substituted URL. An embodiment can add additional data to the received URL to trigger recording, or record site data using another mechanism. For example, an embodiment included in a web browser can record URL data as the browser acts on the data. An embodiment included in a firewall can record URL data as the URL passes through the firewall. An embodiment uses the breadcrumb trail information to further refine the class model based on the user's new activity.

An embodiment also uses the breadcrumb trail information to report results and prompt further actions based on the results. For example, an embodiment could report that users were dissuaded from extraneous sites at 75 percent of the opportunities for distraction they were presented with, thus showing effectiveness of the embodiment. As another example, an embodiment could report that one particular group of users is distracted by a technical site 80 percent of times the users were referred to that site—prompting further investigation, and possibly internal replication of the main content of that site without the distracting elements.

The manner of online site prediction and mitigation described herein is unavailable in the presently available methods. A method of an embodiment described herein, when implemented to execute on a device or data processing system, comprises substantial advancement of the functionality of that device or data processing system in, from a current URL, predicting a user's subsequent URL, and mitigating extraneous site visits by substituting a different URL for the current URL.

The illustrative embodiments are described with respect to certain types of URLs, messages, metadata, circumstances, models, contents, forecasts, thresholds, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
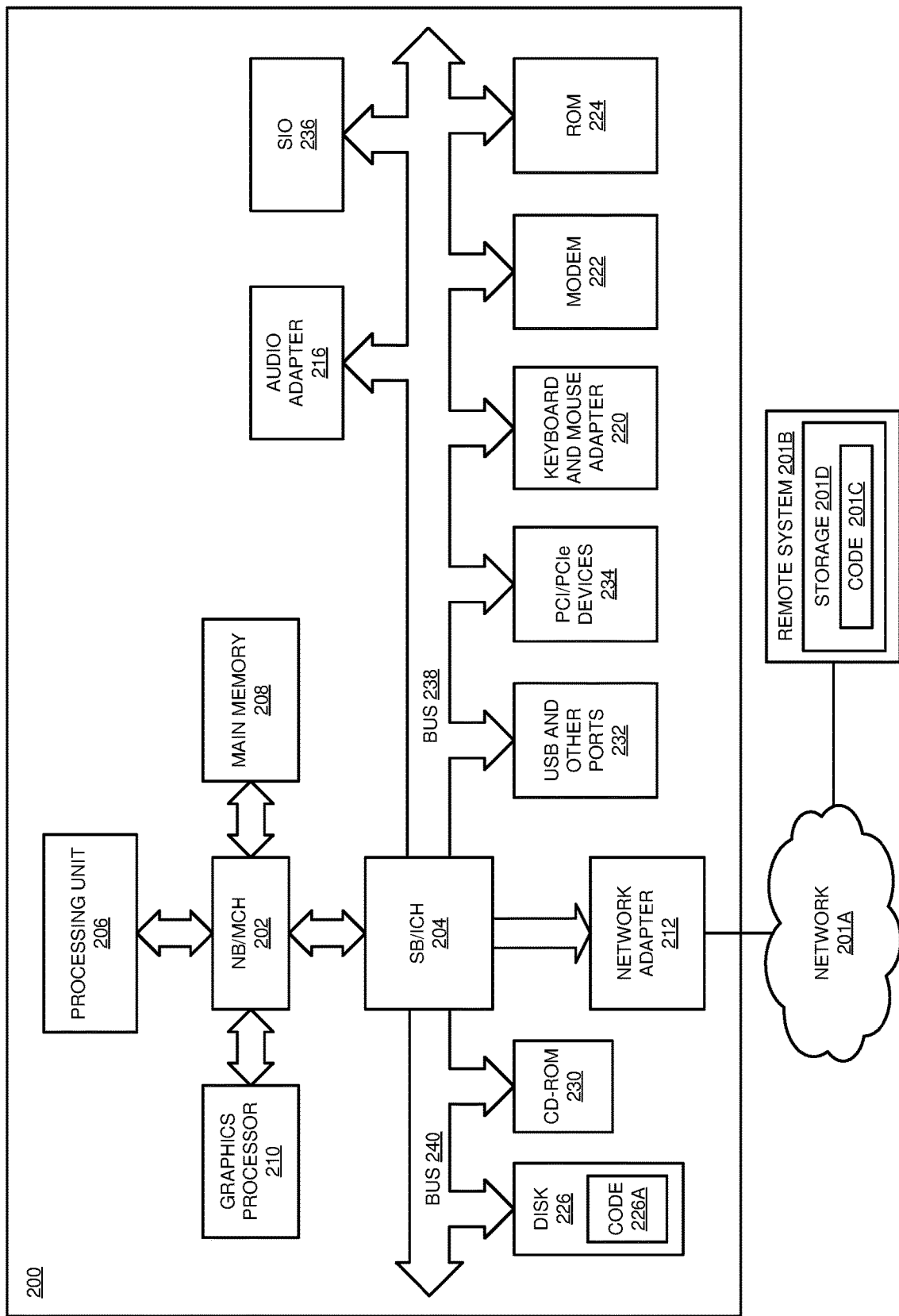
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 runs on any of one or more servers 104 and 106, clients 110, 112, and 114, and device 132, or some combination thereof.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
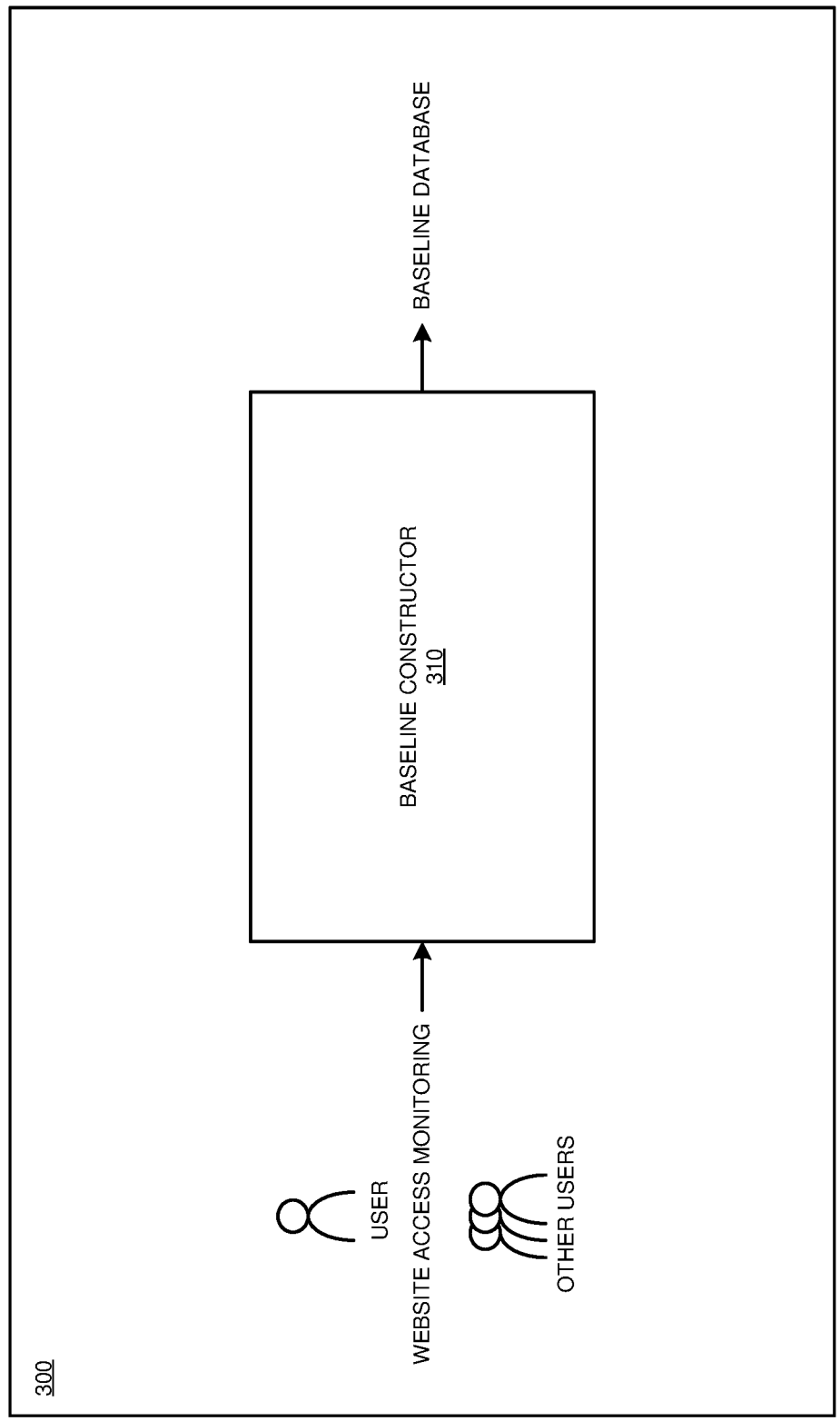
FIG. 3 depicts a block diagram of an example configuration for online site prediction and mitigation in accordance with an illustrative embodiment.

With reference to FIG. 3, this figure depicts a block diagram of an example configuration for online site prediction and mitigation in accordance with an illustrative embodiment. Application 300 is an example of application 105 in FIG. 1 and executes in server 104 in FIG. 1 or any other suitable location.

Application 300 includes baseline constructor 310. Baseline constructor 310 collects a baseline of a user's online activity including information related to the user's online activity, such as which portions of which sites a user visits, the contents of those portions of those sites, at which times of day or days of the week, from which devices, using which browsers or applications, and whether the user provides data to a site or merely consumes site content passively. Baseline constructor 310 collects data for the baseline either in real time, as the user is active online, from archived data, or both. Baseline constructor 310 collects data—both as it is received and from a data archive—from any suitable source, including a user's browser history, cookie information, and information collected from social networking sites. Baseline constructor 310 may also supplement data for one user with data associated with similarly-situated users. Application 300 stores the collected baseline data in a database. The database may be stored in any suitable location, such as in storage 108 in FIG. 1.

Figure 4:
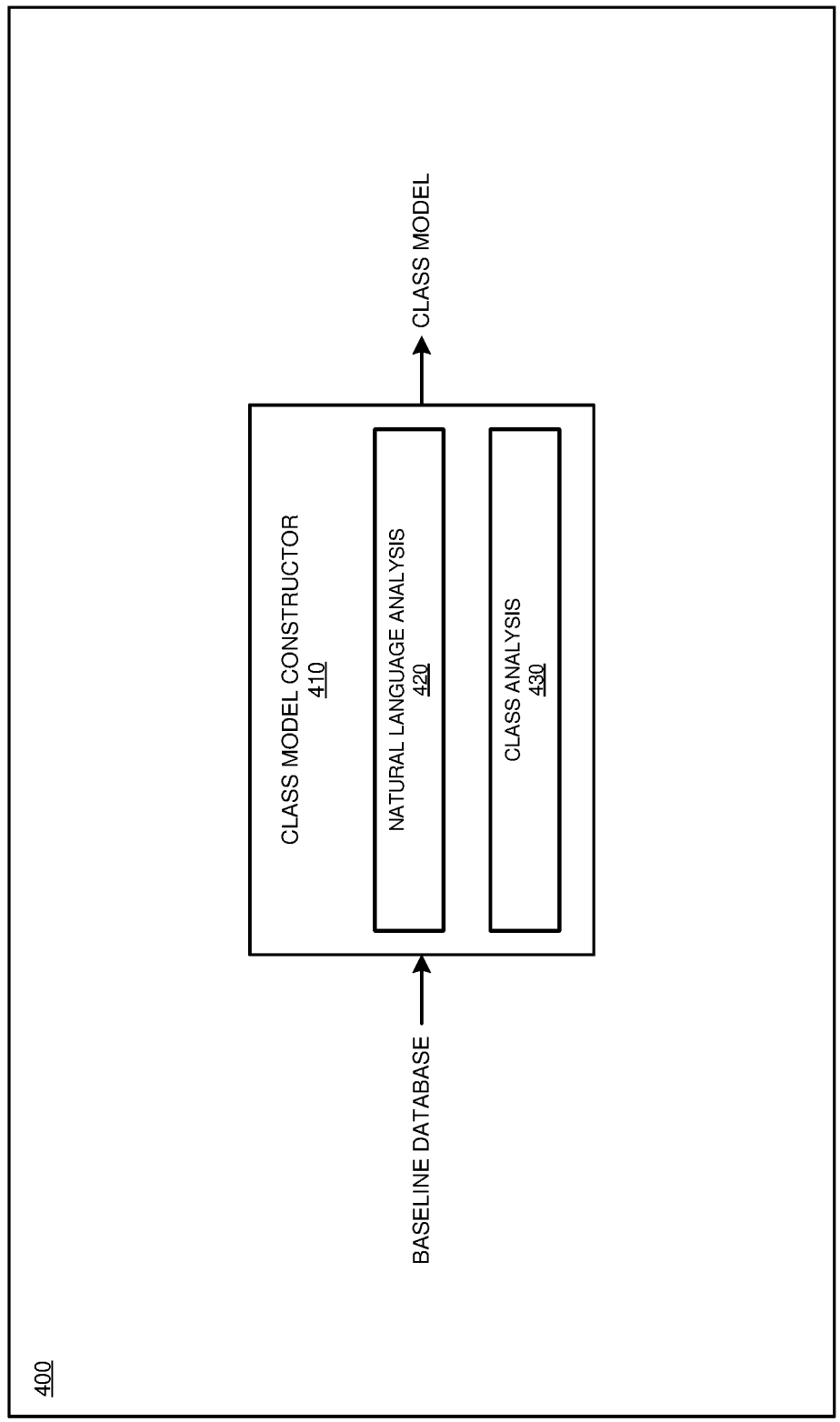
FIG. 4 depicts a block diagram of an example configuration for online site prediction and mitigation in accordance with an illustrative embodiment.

With reference to FIG. 4, this figure depicts a block diagram of an example configuration for online site prediction and mitigation in accordance with an illustrative embodiment. Application 400 is an example of application 105 in FIG. 1 and executes in server 104 in FIG. 1 or any other suitable location.

Application 400 includes class model constructor 410, which includes natural language analysis module 420 and class analysis module 430. Natural language analysis module 420 uses natural language understanding techniques on the content of visited sites, stored in the baseline database, to extract metadata from that content, including concepts, categories, and keywords. Class analysis module 430 uses latent class analysis to derive a class model reflecting the results of the content analysis, as well as analysis of the non-content portions of the baseline data. The class model represents which URLs, referencing which content and associated with which circumstances, have what probability of leading a user to extraneous sites.

Figure 5:
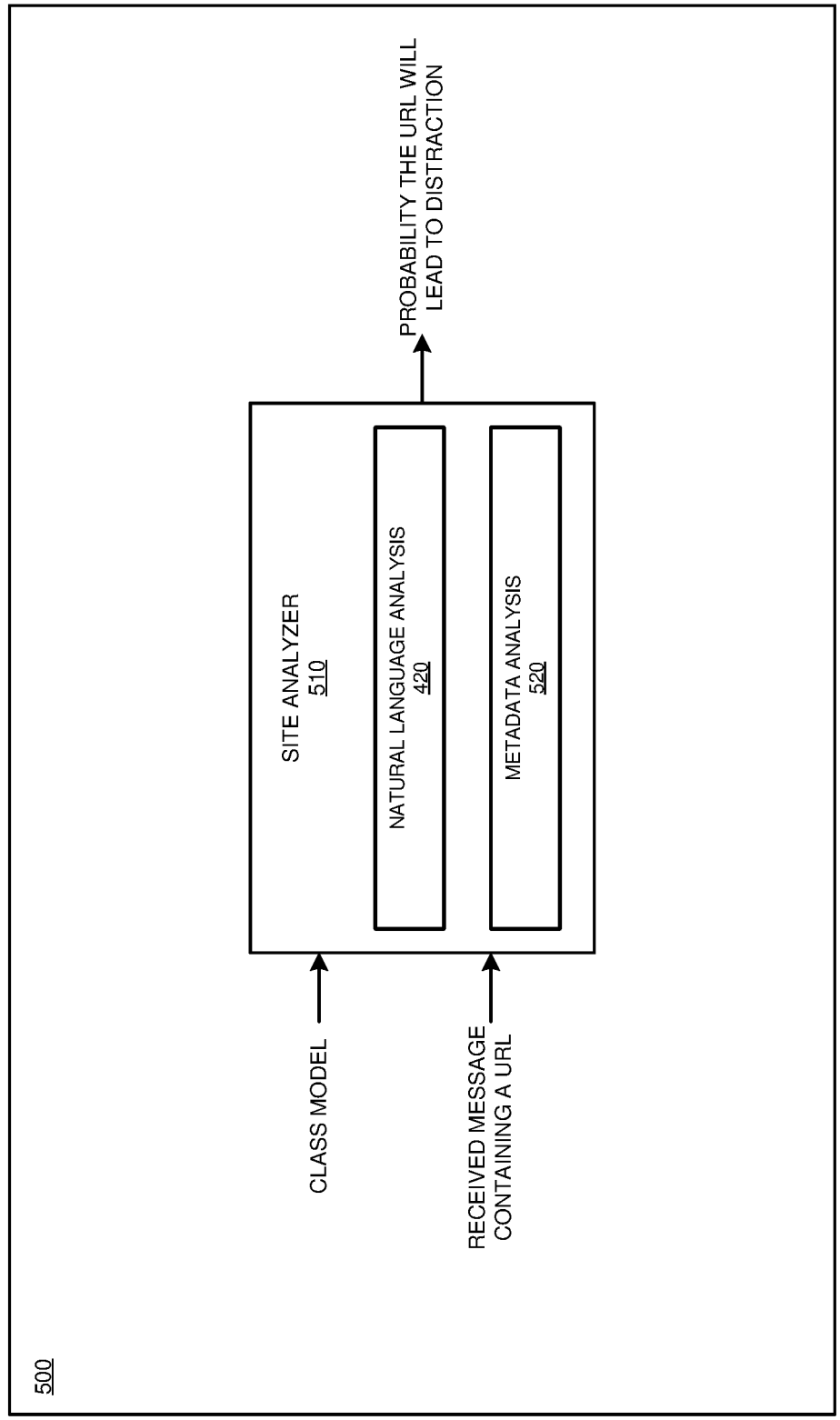
FIG. 5 depicts a block diagram of an example configuration for online site prediction and mitigation in accordance with an illustrative embodiment.

With reference to FIG. 5, this figure depicts a block diagram of an example configuration for online site prediction and mitigation in accordance with an illustrative embodiment. Application 500 is an example of application 105 in FIG. 1 and executes in server 104 in FIG. 1 or any other suitable location. Application 500 includes natural language analysis module 420, which is the same as natural language analysis module 420 in FIG. 4.

Application 500 also includes site analyzer 510, which in turn includes natural language analysis module 420 and metadata analysis module 520. Site analyzer 510 monitors messages sent to the user. Messages for the user may be received via email, a messaging application, a social media platform, a website, or any other means of receiving information. Natural language analysis module 420 analyzes messages to extract a URL, and analyzes content referenced by the URL. Metadata analysis module 520 analyzes metadata associated with the messages. Thus, site analyzer 510 applies a message containing a URL to the class model already generated by application 400 to determine a probability that a URL in a current message will lead a user to one or more extraneous sites.

Figure 6:
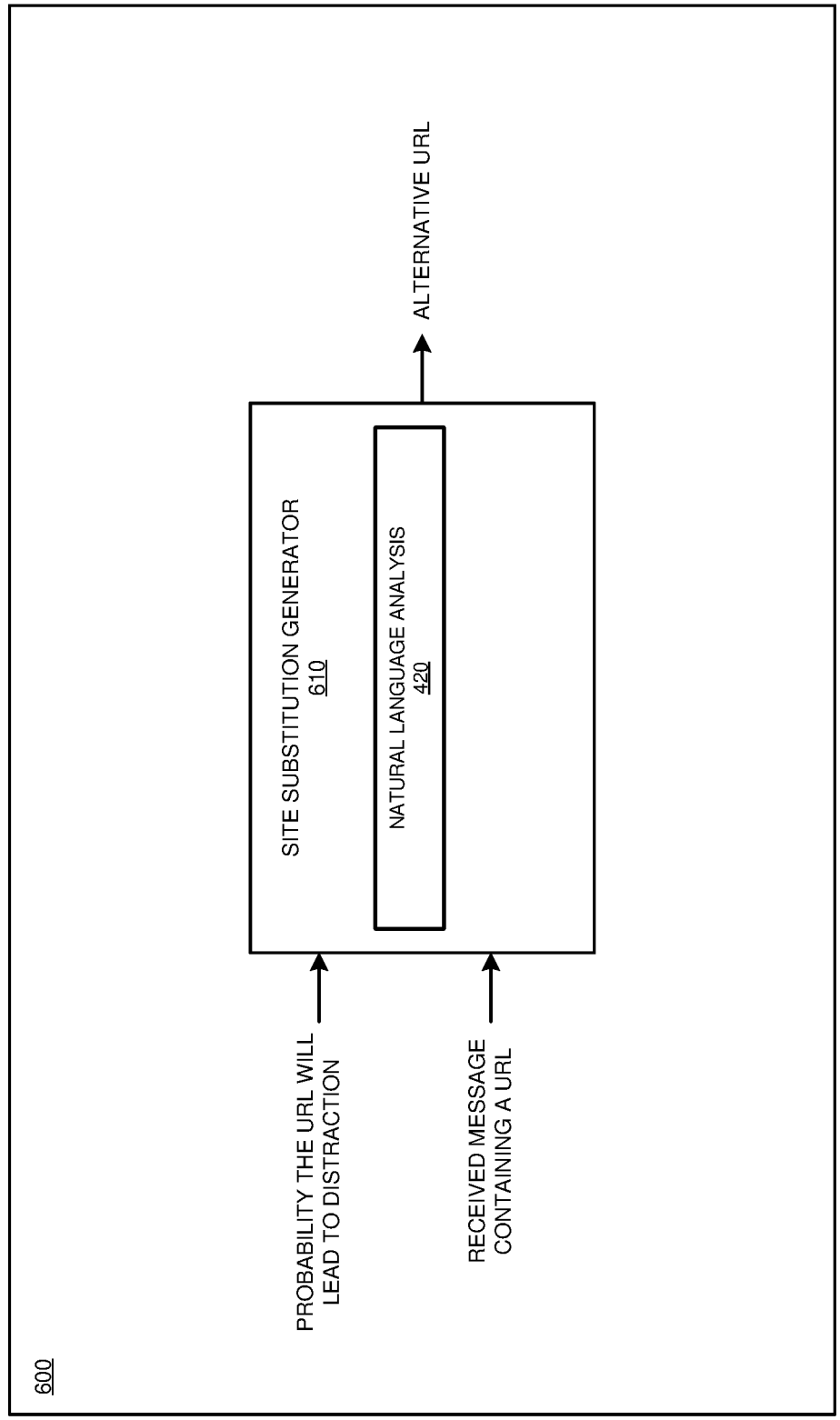
FIG. 6 depicts a block diagram of an example configuration for online site prediction and mitigation in accordance with an illustrative embodiment.

With reference to FIG. 6, this figure depicts a block diagram of an example configuration for online site prediction and mitigation in accordance with an illustrative embodiment. Application 600 is an example of application 105 in FIG. 1 and executes in server 104 in FIG. 1 or any other suitable location. Application 600 includes natural language analysis module 420, which is the same as natural language analysis module 420 in FIG. 4.

Application 600 includes site substitution generator 610. Application 600 receives a message containing a URL, and the probability computed by application 500 that the URL in the message will lead the user to one or more extraneous sites. If the probability is above a threshold, and the user accesses the URL in the message (for example by clicking on or tapping the received link), site substitution generator 610 suggests a different URL, or actually substitutes a different URL for the received URL. The different URL has generally the same content as the first URL, but is missing content that is likely to distract a user. For example, the different URL may omit, eliminate, or remove content present at the first URL, or the different URL may mask, hide content present at the first URL, or the different URL may have replacement or substitute content from the first URL. Site content analysis to support site substitution generator 610 is provided by natural language analysis module 420.

Figure 7:
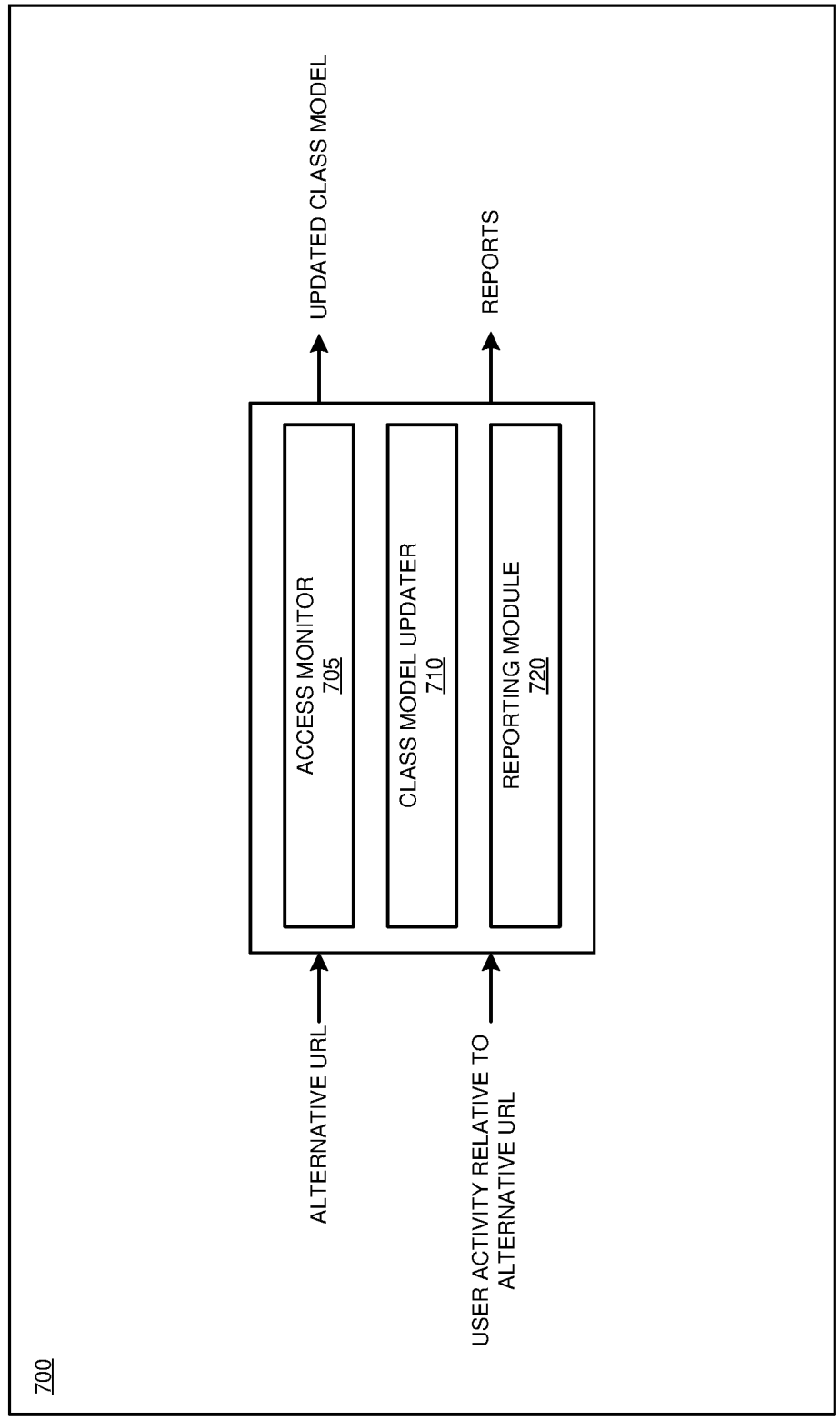
FIG. 7 depicts a block diagram of an example configuration for online site prediction and mitigation in accordance with an illustrative embodiment.

With reference to FIG. 7, this figure depicts a block diagram of an example configuration for online site prediction and mitigation in accordance with an illustrative embodiment. Application 700 is an example of application 105 in FIG. 1 and executes in server 104 in FIG. 1 or any other suitable location.

Application 700 includes access monitor module 705, class model updater 710, and reporting module 720. Access monitor module 705 records the site the user accessed immediately before the received URL, the substituted URL or the received URL if the user declined a substitution, and the site the user accessed immediately after the received or substituted URL. Access monitor module 705 records URL data using any suitable mechanism, such as through the use of URL tags, or using URL data from a web browser or firewall. Class model updater 710 uses the recorded URL data to further refine the class model based on the user's new activity. Reporting module 720 uses the recorded URL data to report results and prompt further actions based on the results. For example, reporting module 720 could gather statistics supporting a report that users were dissuaded from extraneous sites upon 75 percent of the opportunities for distraction they were presented with, thus showing an implementation's effectiveness.

Figure 8:
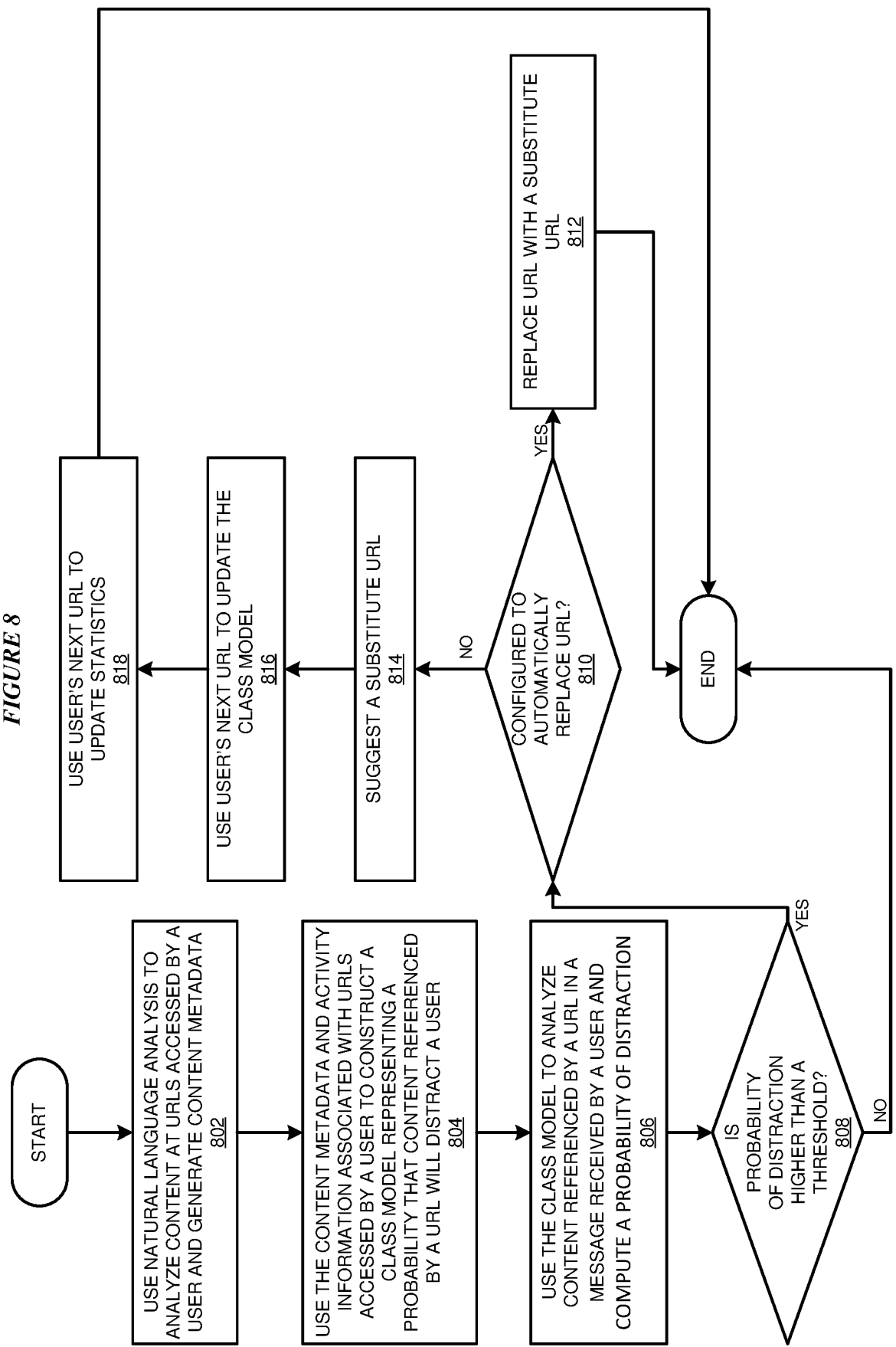
FIG. 8 depicts a flowchart of an example process for online site prediction and mitigation in accordance with an illustrative embodiment.

With reference to FIG. 8, this figure depicts a flowchart of an example process for online site prediction and mitigation in accordance with an illustrative embodiment. Portions of process 800 can be implemented in applications 300, 400, 500, 600, and 700 in FIGS. 3, 4, 5, 6, and 7 respectively.

In block 802 the application uses natural language analysis to analyze content at URLs a user accesses and generate content metadata related to the content at the URLs. In block 804 the application uses the content metadata, as well as activity information associated with the URLs the user accessed to construct a class model. The class model represents a probability that content referenced by a URL will distract a user. In block 806 the application uses the class model to analyze content referenced by a URL in a message received by the user, computing a probability of distraction. In block 808, the application checks whether the probability of distraction is higher than a threshold value. If no ("NO" path of block 808), the application ends. If yes ("YES" path of block 808), in block 810 the application checks whether it is configured to automatically replace the URL with a substitute URL. If yes ("YES" path of block 810), in block 812 the application replaces the received URL with a substitute URL, then ends. If no ("NO" path of block 810), in block 814 the application suggests a substitute URL. In block 816 the application receives data regarding the user's next URL, and uses this data to update the class model. In block 818 the application uses the user's next URL to update statistics for the user and the application as a whole. Then the application ends.

Thus, a computer implemented method, system or apparatus, and computer program product are provided in the illustrative embodiments for online site prediction and mitigation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
generating, using natural language analysis of content at URLs accessed by a user, content metadata;
constructing, from the content metadata and from activity information associated with a set of URLs accessed by the user, a class model, the class model representing a probability that a non-URL portion of content referenced by a URL will prompt the user to access second content at a second URL after accessing the non-URL portion of the content referenced by the URL, wherein the class model is specific to the user, wherein the non-URL portion of the content referenced by the URL lacks a reference to a second content referenced by a second URL;
forecasting, using the class model to analyze a non-URL portion of content referenced by a received URL, a probability that the non-URL portion of the content referenced by the received URL will prompt the user to access third content at a third URL after accessing the non-URL portion of the content referenced by the received URL, the received URL received in a message to the user, the message received via email, a messaging application, or a social media platform;
providing, responsive to determining that the probability is above a threshold probability, a suggested substitute URL to the user in place of the received URL; and
updating, based on content and user activity information associated with a URL accessed by the user subsequent to the received URL, the class model.

2. The method of claim 1, wherein the activity information associated with the set of URLs accessed by the user comprises a time of day at which the user accessed each URL in the set of URLs.

3. The method of claim 1, wherein the activity information associated with the set of URLs accessed by the user comprises a sequence in which the user accessed each URL in the set of URLs.

4. The method of claim 1, further comprising:
accessing, responsive to determining that the probability is above a threshold probability, content referenced by a substitute URL in place of the received URL.

5. The method of claim 1, further comprising: reporting, based on content and user activity information associated with the URL accessed by the user subsequent to the received URL, statistics associated with online activity of the user.

6. A computer usable program product comprising one or more computer-readable storage media, and program instructions stored on at least one of the one or more storage media, the stored program instructions comprising:
program instructions to generate, using natural language analysis of content at URLs accessed by a user, content metadata;
program instructions to construct, from the content metadata and from activity information associated with a set of URLs accessed by the user, a class model, the class model representing a probability that a non-URL portion of content referenced by a URL will prompt the user to access second content at a second URL after accessing the non-URL portion of the content referenced by the URL, wherein the class model is specific to the user, wherein the non-URL portion of the content referenced by the URL lacks a reference to a second content referenced by a second URL;
program instructions to forecast, using the class model to analyze a non-URL portion of content referenced by a received URL, a probability that the non-URL portion of the content referenced by the received URL will prompt the user to access third content at a third URL after accessing the non-URL portion of the content referenced by the received URL, the received URL received in a message to the user, the message received via email, a messaging application, or a social media platform;
program instructions to provide, responsive to determining that the probability is above a threshold probability, a suggested substitute URL to the user in place of the received URL; and
program instructions to update, based on content and user activity information associated with a URL accessed by the user subsequent to the received URL, the class model.

7. The computer usable program product of claim 6, wherein the activity information associated with the set of URLs accessed by the user comprises a time of day at which the user accessed each URL in the set of URLs.

8. The computer usable program product of claim 7, wherein the activity information associated with the set of URLs accessed by the user comprises a sequence in which the user accessed each URL in the set of URLs.

9. The computer usable program product of claim 7, further comprising:
program instructions to access, responsive to determining that the probability is above a threshold probability, content referenced by a substitute URL in place of the received URL.

10. The computer usable program product of claim 6, further comprising: program instructions to reporting, based on content and user activity information associated with the URL accessed by the user subsequent to the received URL, statistics associated with online activity of the user.

11. The computer usable program product of claim 7, wherein the stored program instructions are stored in a computer readable storage device in a data processing system, and wherein the stored program instructions are transferred over a network from a remote data processing system.

12. The computer usable program product of claim 7, wherein the stored program instructions are stored in a computer readable storage device in a server data processing system, and wherein the stored program instructions are downloaded over a network to a remote data processing system for use in a computer readable storage device associated with the remote data processing system.

13. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to generate, using natural language analysis of content at URLs accessed by a user, content metadata;
program instructions to construct, from the content metadata and from activity information associated with a set of URLs accessed by the user, a class model, the class model representing a probability that a non-URL portion of content referenced by a URL will prompt the user to access second content at a second URL after accessing the non-URL portion of the content referenced by the URL, Wherein the class model is specific to the user, wherein the non-URL portion of the content referenced by the URL lacks a reference to a second content referenced by a second URL;
program instructions to forecast, using the class model to analyze a non-URL portion of content referenced by a received URL, a probability that the non-URL portion of the content referenced by the received URL will prompt the user to access third content at a third URL after accessing the non-URL portion of the content referenced by the received URL, the received URL received in a message to the user, the message received via email, a messaging application, or a social media platform;
program instructions to provide, responsive to determining that the probability is above a threshold probability, a suggested substitute URL to the user in place of the received URL; and
program instructions to update, based on content and user activity information associated with a URL accessed by the user subsequent to the received URL, the class model.

14. The computer system of claim 13, wherein the activity information associated with the set of URLs accessed by the user comprises a time of day at which the user accessed each URL in the set of URLs.

15. The computer system of claim 13, wherein the activity information associated with the set of URLs accessed by the user comprises a sequence in which the user accessed each URL in the set of URLs.

16. The computer system of claim 13, further comprising:
program instructions to access, responsive to determining that the probability is above a threshold probability, content referenced by a substitute URL in place of the received URL.

* * * * *